United States Patent
Frederick

(10) Patent No.: US 8,590,981 B2
(45) Date of Patent: Nov. 26, 2013

(54) MINERAL SEAM DETECTION FOR SURFACE MINER

(75) Inventor: Larry D. Frederick, Huntsville, AL (US)

(73) Assignee: Geosteering Mining Services, LLC, Huntsville, AL (US)

( * ) Notice: Subject to any disclaimer, the term of this patent is extended or adjusted under 35 U.S.C. 154(b) by 164 days.

(21) Appl. No.: 13/219,352

(22) Filed: Aug. 26, 2011

(65) Prior Publication Data

US 2012/0049607 A1    Mar. 1, 2012

Related U.S. Application Data

(60) Provisional application No. 61/377,503, filed on Aug. 27, 2010.

(51) Int. Cl.
*E21C 35/08* (2006.01)

(52) U.S. Cl.
USPC .............................................. 299/1.2; 299/1.4

(58) Field of Classification Search
USPC ................................... 299/1.05, 1.1, 1.2, 1.4
See application file for complete search history.

(56) References Cited

U.S. PATENT DOCUMENTS

| | | | | |
|---|---|---|---|---|
| 4,165,460 A | * | 8/1979 | Frosch et al. | 378/89 |
| 4,262,964 A | * | 4/1981 | Ingle et al. | 299/1.1 |
| 4,952,000 A | | 8/1990 | Lipinski et al. | |
| 4,981,327 A | * | 1/1991 | Bessinger et al. | 299/1.1 |
| 5,334,838 A | * | 8/1994 | Ramsden, Jr. | 250/361 R |
| 5,667,279 A | | 9/1997 | Christopher et al. | |
| 6,435,619 B1 | * | 8/2002 | Frederick et al. | 299/1.1 |
| 6,666,521 B1 | | 12/2003 | Pease et al. | |
| 7,402,804 B2 | | 7/2008 | Frederick et al. | |
| 2002/0030400 A1 | | 3/2002 | Frederick et al. | |
| 2005/0173639 A1 | | 8/2005 | Frederick et al. | |

* cited by examiner

*Primary Examiner* — David Bagnell
*Assistant Examiner* — Michael Goodwin
(74) *Attorney, Agent, or Firm* — Dickstein Shapiro LLP

(57) ABSTRACT

A method and apparatus for detecting the presence of mineral seams during coal or ore mining operations. A mining machine with a cutter drum includes a detector assembly that includes two detectors attached near the surface cut by the cutter drum. The detectors include downward facing windows that receive gamma radiation from mined material and undesirable material. One detector is positioned lower than the other and over a trench created below the surface cut by the cutter drum. The cutting depth of the cutter drum may be controlled based on radiation levels detected by the detectors.

33 Claims, 16 Drawing Sheets

| | SURFACE MINER CONTROLS FOR MAKING LAST CUT IN COAL SEAM | | | | | |
|---|---|---|---|---|---|---|
| CASE | CUTTER POSITION | COUNTS FROM TRENCH DET | COUNTS FROM SURFACE DET | DISPLAY MODULE | CUTTER ACTION | NOTES |
| 1 | CUTTER SUBSTANTIALLY ABOVE CLAY INTERFACE | LOW COUNTS | LOW COUNTS | RED | LOWER | AS CUTTER APPROACHES THE CLAY INTERFACE, THE COUNTS FROM BOTH DETECTORS WILL BEGIN TO INCREASE WITH THE TRENCH DETECTOR BEING SLIGHTLY HIGHER |
| 2 | CUTTER 2.5" ABOVE CLAY INTERFACE | APPROACHING MAXIMUM FOR THIS CLAY SEAM | 10% BELOW TRENCH DETECTOR COUNTS | YELLOW | LOWER | WITH A 2.5" DEEP TRENCH, THE TRENCH DETECTOR WILL BE READING ALMOST MAXIMUM. SURFACE DETECTOR WILL BE LIGHTLY LESS DUE TO 2.5" COAL ABOVE CLAY |
| 3 | CUTTER 1.0" ABOVE CLAY INTERFACE | MAXIMUM | SLIGHTY BELOW TRENCH DETECTOR COUNTS | GREEN | HOLD | LOWER OCCASIONALLY TO DETECT INTERFACE BY RISE IN COUNTS OF SURFACE DETECTOR TO MATCH READINGS FROM TRENCH DETECTOR |
| 4 | CUTTER BELOW CLAY INTERFACE | MAXIMUM FOR THIS SEAM | MAXIMUM FOR THIS STREAM | RED | RAISE | BOTH DETECTORS MAX AND EQUAL MEANS CUTTER IS IN CLAY. RAISE UNTIL SURFACE DETECTOR COUNTS BEGIN TO REDUCE. |

FIG. 11

| SURFACE MINER CONTROL PROCESS FOR CLEANING CLAY FROM ABOVE COAL SEAM (2.5" TRENCH) | | | | | | |
|---|---|---|---|---|---|---|
| CASE | CUTTER POSITION | COUNTS FROM TRENCH DET | COUNTS FROM SURFACE DET | DISPLAY MODULE | CUTTER ACTION | NOTES |
| 5 | CUTTER SUBSTANTIALLY ABOVE CLAY INTERFACE | MAXIMUM FOR THIS CLAY SEAM | MAXIMUM FOR THIS CLAY SEAM | RED | LOWER | BOTH DETECTORS GIVING MAXIMUM READINGS FOR THIS CLAY SEAM MEANS THAT THE CUTTER IS IN THE CLAY. LOWER UNTIL THE COUNTS FROM THE TRENCH DETECTOR GOES TO ITS MINIMUM WITH SURFACE DETECTOR COUNTS BEING SLIGHTLY HIGHER |
| 6 | CUTTER 2.5" ABOVE COAL INTERFACE | NEAR MINIMUM | 10% BELOW MAXIMUM | YELLOW | LOWER | WITH A 2.5" OF CLAY UNDER THE SURFACE DETECTOR, IT WILL READ ABOUT 10% BELOW ITS MAXIMUM (FOR THIS CLAY SEAM) WHILE THE TRENCH DETECTOR WILL READ NEAR ITS MINIMUM |
| 7 | CUTTER 1.0" ABOVE COAL INTERFACE | MINIMUM. MAINLY BACKGROUND COUNTS | SLIGHTY HIGHER THAN TRENCH DETECTOR | GREEN | HOLD | MAY RAISE OCCASIONALLY TO SEE THE SURFACE DETECTOR COUNTS INCREASE AND THEN LOWER THE CUTTER A SMALL AMOUNT DEPENDING ON DISPLAY RESPONSE |
| 8 | CUTTER BELOW CLAY INTERFACE | MINIMUM. MAINLY BACKGROUND COUNTS | MINIMUM. MAINLY BACKGROUND COUNTS | RED | RAISE | RAISE CUTTER UNTIL SURFACE DETECTOR COUNTS INCREASE, INDICATING THAT SOME CLAY IS NOW UNDER THE CUTTER |

FIG. 12

MINERAL SEAM DETECTION FOR SURFACE MINER

CROSS-REFERENCE TO RELATED APPLICATIONS

This application claims the benefit of U.S. provisional application 61/377,503, filed on Aug. 27, 2010, the subject matter of which is incorporated herein by reference in its entirety.

BACKGROUND

The present invention generally relates to a method and apparatus for detecting the presence of mineral seams during coal or ore mining operations.

Many concepts have already been tried, over a period of many years, to improve mining controls to increase the amount of coal, or other mineral, cut by the mining equipment and to decrease the amount of undesirable rock, clay or other material cut by the mining equipment. Many of these concepts involve "guidance" systems that direct or point the miner where to cut, based on predictions or assumptions related to the location of the mineral-rock interface. These predictions or assumptions are typically based on data or information obtained from the experience of the mining equipment from previous cuts.

A typical configuration of a continuous miner is to have a rotary cutter, perhaps three to six feet in diameter, followed by a means to collect the cut material and to transport the material to a means of conveyance. In most instances, the ideal operation is for the cutter to remove all the desirable material from above undesirable material or to remove all undesirable material from above the desirable material. However, almost always there is some desirable material left to cut, or some undesirable material cut with the desirable material. After cutting, the mixed undesirable and desirable material may be further separated in a preparation plant to increase the quality of the material. But the separation process adds significant expense, and with known commercially and economically feasible techniques cannot achieve complete separation and purity of the material. A Rock Avoidance System is designed to provide the controls to help accomplish higher quality cutting, either by providing information to the operator or by automatically controlling the position of the cutter relative to the interface between desirable and undesirable material, or a combination of the two approaches.

One technique employs repetitive cycles. A computer is instructed by the miner operator to perform specific cycles or the control system is programmed to memorize operator actions over a cycle and duplicate them. This technique does not work well because of the high variability of the rock and mineral formations and operational considerations. This technique is particularly ineffective when applied to continuous miners and surface miners, because the miner rides on the floor that has been cut resulting in cutting errors (e.g., leaving an excessive layer of coal on the floor, or cutting excessively down into the rock on the floor) for one cut tending to be amplified for subsequent cuts.

In the case of long-wall mining there is some opportunity to utilize what has been learned on one pass along the mineral face to improve upon cutting strategy for the next pass along the face. One technique utilizes a memory system to log the profiles of the rock face at the floor and roof on one pass and then to use this knowledge to influence the cutting as the cutters pass along the same face, going in the opposite direction. This technique has been of only limited success because the rock face profile on one pass does not exactly reflect the needed rock face profile of the next pass and because there is much variability in the formations and mining operations. Consequently, such equipment and operation are limited in their efficiency in cutting to the rock-coal interface using guidance strategy.

Systems have been developed that are able to detect an interface between coal and rock using sensors aimed at the mineral being cut that are mounted away from the cut surface, such as up on the boom of a cutter drum, or up on structure behind the cutter drum. See U.S. Pat. No. 7,402,804, Geosteering of Solid Mineral Mining Machines, the disclosure of which is incorporated herein by reference. However, for some applications, such as surface mining of lignite coal, the radiation emitted by the undesirable material, typically clay, may be weak and difficult to detect by a system described above that is mounted away from the cut surface, such as up on the boom of a cutting drum, or up on structure behind the cutting drum. And on some surface miners, there is insufficient structure to mount a detector system aimed at the mineral being cut.

For a manually controlled approach, the operator needs information about the position of the cutter relative to the coal/rock interface. In the absence of a Rock Avoidance System, the operator must rely upon a variety of cues to determine if the cutter is at the interface, above the interface, or below the interface. In principle, there are two general cutting strategies to be employed. One is to emphasize the avoidance of mining rock or clay while trying to mine as much of the desirable mineral as possible. The other is to ensure that all the mineral is mined but also try to take as little undesirable material as possible. It can be argued that if properly implemented, both strategies produce the same result, but considering all the variables and human factors, one strategy tends to produce higher production and the other tends to produce a cleaner mined product. Choosing between these strategies requires some change in the algorithms or signals that are displayed to the operator but involves that same fundamental elements. Therefore, for purposes of describing the operation, an idealized approach will be taken where the objective is to control the cutter to be positioned at the interface.

The following discussion relates to mining lignite, which typically has layers of clay between layers of lignite coal. The operator of a surface miner is typically looking down at the exposed uncut material behind the cutter, and may be using video cameras, to determine the depth that the cutter is going into the clay below the coal, by visually observing the shade or color of the un-mined material behind the mold board. Once into the clay, even when its appearance is different from the coal, it is impossible to determine from the color or shade of the un-mined material how deeply the cutter is going into the clay. One cue to the operator is to visually observe the color and consistency of the material being dumped into a haul truck that follows along at the side of the miner. Whenever the operator sees significant amounts of clay in the product being mined, referred to as the Run of Mine (ROM), he can respond to raise the cutter. By that time the conveyor is already filled with a mixture of clay and coal. In order to assure that the cutter is not going further into the clay than necessary demands that the operator frequently raise the cutter until the color of the material begins to change, indicating that the cutter is then above the coal-to-clay interface. However, at that point, the cutter is leaving coal. Therefore, the operator must immediately lower the cutter to again begin removing all the coal. Given that the foimation is rolling both in the direction of travel and also perpendicular to that direction, the operator is confronted with a very challenging control task. This controlling operation is even more challenging as a result of two additional factors: (1) reaction time and (2) other operator tasks that distract from the cutting task.

Video cameras are sometimes located behind the mold board and behind the cutter, so a given cut surface (or cut floor) location is seen once the miner has moved forward sufficiently to bring the location in the camera's view, which occurs a few seconds after the cutting has been performed. If a cutting error is made, it cannot be known by the operator until after the cameras pass over the material to expose a change in the color, shade, or character of the un-mined material. Then, there is a time delay required for the operator to react and for the machine to respond to an instruction from the operator. A delay factor is unavoidable for a manually controlled machine.

It is the second factor that, in combination with reaction time, produces the greatest effective cutting error. The operator has many other essential tasks to perform. He must frequently observe the position of the truck relative to the conveyor in order to properly load the truck. He must frequently communicate with the driver of the truck, and sometimes with other trucks that are lining up to be in proper position. He must observe the mined material as it goes onto the truck for indications that too much clay is being mined. There are instruments to monitor and controls to use. The most distracting task may be that of guiding the miner, requiring the operator to look down, in the direction of travel, to keep the crawler tracks in the correct position. Another task is to determine if the surface miner is aligned left-to-right with the formation, in the roll axis. There is a practical limit to how rapidly he can direct his viewing between the other tasks and the controlling of the cutter height.

If the operator is trying to make sure that all the coal is mined, there will frequently be at least a small amount of clay in the ROM. Monitoring ROM quality necessitates the operator to confirm visually that there is a small amount of clay in the coal but to ensure that the amount of clay in the ROM is not excessive. If there is no clay in the ROM, the operator must assume that the cutter is above the interface and is therefore leaving some coal un-mined. He may, depending upon other cues, then immediately lower the cutter without overreacting, considering his reaction time and that of the machine and the variability of the seam interface. This quality monitoring and controlling task requires that the operator be carefully observing the mined product, uninterrupted. Given that the coal being loaded into the truck is the result of cutting actions many feet behind the current location of the cutter, a significant delay in feedback in evaluating quality results, which in turn adds back to the reaction time and delays discussed earlier. When the floor cannot be observed because other tasks are being performed, cutting errors are likely, especially since the cutter must be frequently raised up to the interface in order to assure that it is not going deeply into the clay. As a result, it becomes clear why the operators report that they must rely upon observing the quality of the ROM, even though that is much too late to accomplish cutting with the desired accuracy.

In some instances, the clay under the coal is the same color and shade as the coal, so that there are essentially no visual cues at or around the interface, which is the target. In such instances, the lack of visual cues makes it much more difficult to approximate the ideal cut of all desirable material and no undesirable material.

The above discussion is directed to making the final cut to remove coal from above the coal-to-clay interface. Use of the surface miner to clean clay from the top of a mineable coal seam is also highly desirable. Tasks to be performed by the operator during the cleaning phase are similar to those of the cutting phase. Some of the same type challenges are present. If the priority for the operator is implementing the Full Seam Extraction strategy, the requirement is to leave all the coal after removing as much clay a possible. But, there is no way to determine the thickness of the layer of clay over the coal, based solely upon its appearance, either by direct observation or in the video cameras. A thick layer will have the same appearance as a thin layer. Only when the coal under the clay begins to be exposed can the operator determine that the cutter is at the interface. Therefore, in order to not leave too much clay, he must frequently lower the cutter enough to reach the coal so that the difference in color or shade can be seen. However, when this happens, some coal is being removed with the clay that is to be discarded. So, it is important to quickly raise the cutter again. Accomplishing this task to the precision desired would require that the operator be able to observe the mined interface almost continuously, which was shown in the above discussion to be practically impossible.

Thus, a need exists to provide a system that is able to detect an interface between a layer of lignite coal and a layer of clay to help avoid cutting the lignite layer and clay layer at the same time. And there is a clear need to be able to position the cutter as close as possible to that interface in order to remove all the coal without removing any of the clay under the coal.

SUMMARY

In one aspect, the present mineral seam detection system is provided for lignite coal mining using differential armored gamma detectors and controlling the miner to cut to the detected coal/clay interface. Two armored gamma radiation detectors are positioned behind the cutter, one at the surface of the cut and the other slightly lower in a trench cut by a plow or scoop following the cutter. The plow may be preceded by rippers that loosen the material prior to being penetrated by the plow, in order to reduce the force required by the plow to separate the material from the formation. Differences between the levels of radiation sensed by the surface detector and the trench detector are used for predicting location of the cutter relative to the coal/clay interface. In other aspects, the system may be used to control the position of the cutter of a surface miner for removal of clay from above the mineral, or to control the cutting of the trailing drum of a long-wall mining system.

In another aspect, the mold board that typically follows the cutter of a surface miner to collect the mined material so that it can be moved onto a conveyor belt, and typically has a flat surface that rides on the surface of the floor that has just been created by removal of the material above the floor, in order to provide differential gamma measurements, one measurement is made above the cut floor and one is made below the cut floor, a trench being made to expose material to one detector that is below that which is exposed to the other gamma detector. At the rear of this portion of the mold board, rippers are added for the purpose of breaking up the uncut material so that the plow, which follows immediately behind the rippers can more easily remove the material. The plow removes the material and pushes it to the side so that it does not pass under the detector assembly, forming a trench through which one of the detectors pass. The other detector travels over the uncut surface adjacent to the trench.

The system described here greatly improves the cutting process by providing timely indications to the operator, in a way that is convenient for the operator to respond, or is done by computer with provisions for override by the operator.

Two methods of display are provided. The amount of radiation being measured by both detectors, one measuring in the trench and one measuring on the surface, is presented in an analog fashion. In one aspect a display technique uses a vertical led-driven display that illuminates an LED associated with the amount of radiation. A suitable configuration may have 50 LEDs, adjusted so that the minimum radiation to be measured in a given mine is between the bottom 3-5 LEDs and the maximum radiation illuminating an LED that is less than the 45th LED, giving room for the maximum to occasionally reach, or nearly reach, the top LED when the radiation statistics produce such a maximum value.

A second method is to utilize a micro-controller to read the detector measurements and make decisions that are presented to the operator by small LEDs that are placed in locations that are within the operator's peripheral field of view. By positioning these indicators properly, the operator can see the an LED that is illuminated, while performing other essential duties. For example, one set of LEDs can be placed in the window in the direction of a truck being loaded on the left side of the miner and another set can be placed in the window on the right side. A third set of LEDs can be near the window that allows the operator to view the tracks while guiding the travel of the machine. These three sets of LEDs allow the operator to be performing normal tasks most of the time while simultaneously be responsive to an indication that the cutter has passed through the interface or that the cutter is not close enough to the interface.

Use of both types of indicators is desirable to allow cross-checking the LED indications, especially when transitioning from one cut to another or when responding to unusual anomalies within the formation.

Instead of the output from the micro-controller only giving indications, the signals to the LEDs may be also be routed to the cutter control system to automatically control the cutter, with the provision that the operator controls override the automatic signals. This redundancy of control paths is advantageous when moving from one place to another and when responding to anomalies in the formation.

In another aspect, to enhance the precision of control, provisions are made to allow a continuous averaging of the detector measurements during the many times when the miner must pause forward motion.

BRIEF DESCRIPTION OF THE DRAWINGS

FIGS. 11 and 12 are tables of display modes for the displays of FIG. 5.

DETAILED DESCRIPTION OF PREFERRED EMBODIMENTS

Figure 1:
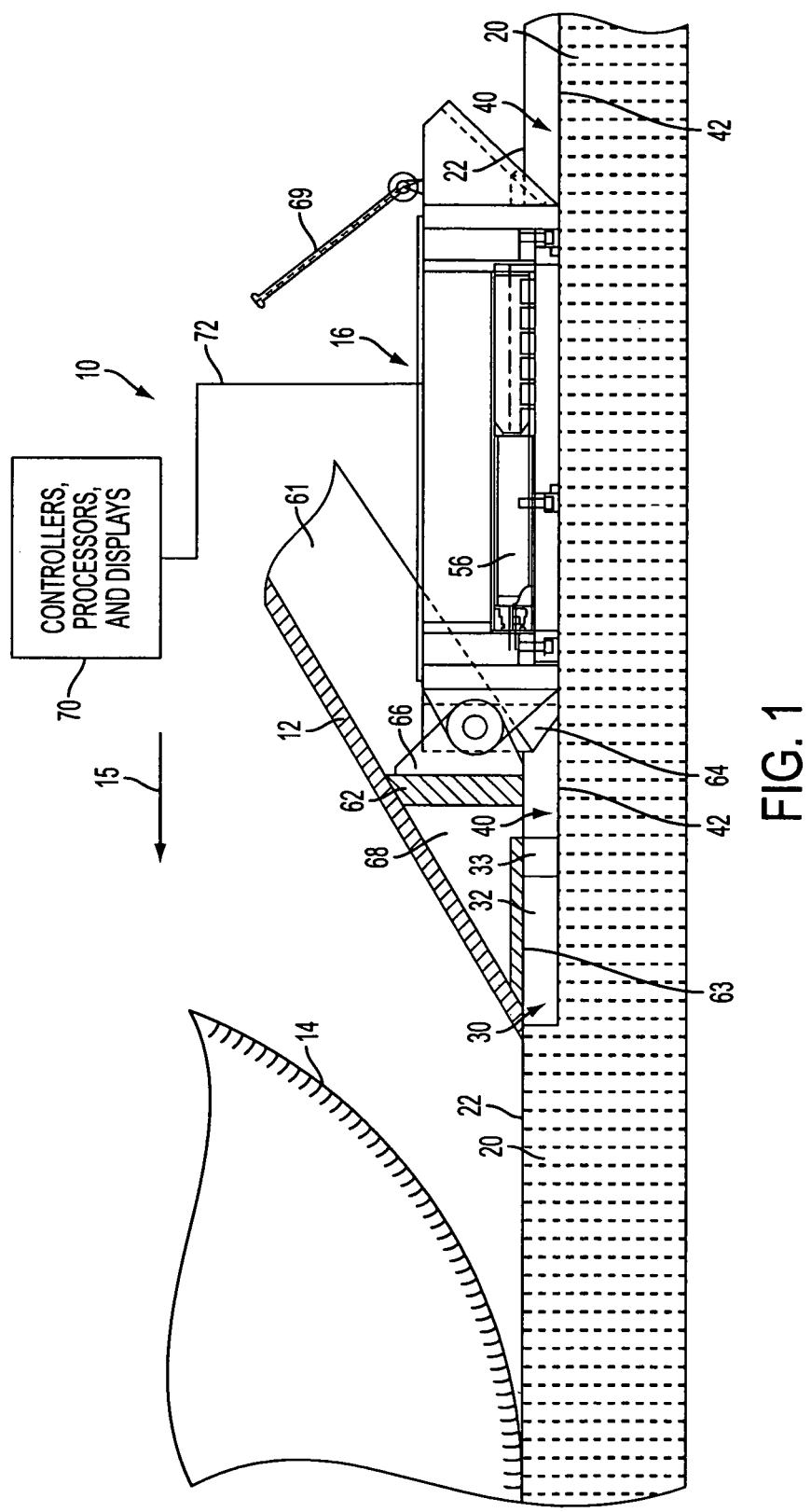
FIG. 1 is a view taken along line I-I of FIG. 2 of a mineral seam detector system mounted on a piece of equipment according to a first exemplary embodiment.
Figure 2:
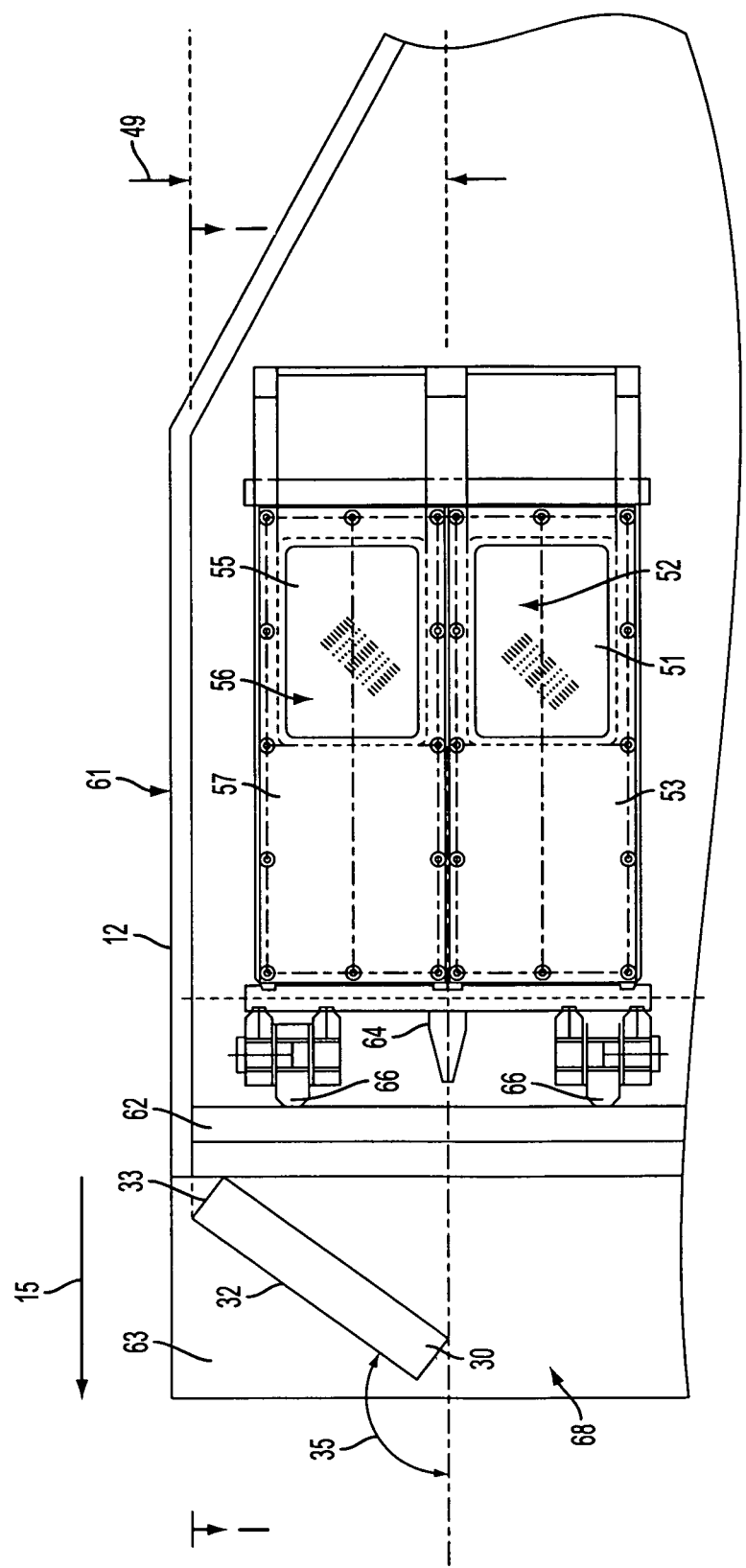
FIG. 2 is a bottom view of the system of FIG. 1.

Refer now to FIGS. 1 and 2, there being shown a mineral seam detector system 10 according to an exemplary embodiment. The system 10 includes a detector assembly 16, mounted to a surface miner mold board 68 on the underside of a surface mining machine 12.

A surface miner 12 moves horizontally in the direction 15 across a formation while controlling the height of the cutter 14 above the mineral interface. Although, it is possible to install a gamma detector in the general area behind the cutter to allow viewing of the formation as it is being cut, there are structural/geometric considerations, such as a lack of space, that prevent this approach from being practical to implement, at least to do so in a way that will allow sufficiently precise controlling of the process. Therefore, the Rock Avoidance System gamma detectors are best positioned a few feet further back on the machine, behind the mold board.

The assembly 16 has two gamma detectors, a trench gamma detector 56 and a surface gamma detector 52, positioned side by side. The dual gamma detectors 52 and 56 are armored to protect them from the harsh environment. The detectors 56 and 52 are provided with fiber windows 55 and 51, respectively, in the armor to allow gamma radiation to reach the detectors' gamma sensors. The clevis assemblies 66 may be oriented to best fit the geometry of the miner structure. The assembly 16 communicates by way of appropriate cabling or wireless or Bluetooth connections 72 with the controllers, computers, and displays 70.

The assembly 16 is supported at the front by a pair of clevis assemblies 66 so that it may pivot up or down about the assemblies 66. The clevis assemblies 66 are welded to a mounting plate 62 that is welded to, and extends across, the mold board 68 between the mold board sides 61. The assembly 16 is supported at the rear by one or more flexible cables 69 that allows the assembly 16 to pivot upward, such as if it encounters an obstruction. The upper ends of the cables 69 are attached to the mold board 68.

The system 10 also includes a plow 30 welded or otherwise supported on the bottom of the plate 63 of the mold board 68. The illustrated plow 30 is an about two-inch thick steel bar, about fifteen inches in length, mounted with a leading side 32 at an angle 35 of about one hundred twenty-five degrees with the direction of travel 15, and a trailing end 33.

In operation, as the surface miner 12 travels forward in the direction 15, the surface miner cutter drum 14 rotates to cut material from the surface of the earth. In the illustrated embodiment, the cutter drum 14 is cutting a seam 20 of lignite, often referred to as brown coal, a soft brownish-black fuel with characteristics that put it somewhere between coal and peat. As the miner 12 moves forward, the cutter 14 cuts down the seam 20 (which is thicker in front of the cutter 14) to form and leave behind a freshly-cut surface (or floor) 22. In known fashion, the mold board 68 is a large pan positioned to scoop up the freshly cut lignite from the surface 22 and direct it to a conveyor (not shown) to be conveyed to a dump truck or other desired place of deposit.

The plow 30 is mounted to the bottom plate 63 of the mold board 68, so that the plow 30 is pushed below the surface 22 to form a trench 40 having a width 49 between the trench sides 44 and 46. Because the mold board plate 63 is at the surface 22, the trench 40 has a depth 48 (FIG. 3) from the surface 22 to the trench floor 42 about equal to the thickness of the plow 30. The trench detector 56 is mounted so that the detector window 55 of its bottom surface 57 is positioned over the trench 40. The surface detector 52 is mounted so that the detector window 51 of its bottom surface 53 is not positioned over the trench 40. Further, the trench detector 56 is mounted lower than the surface detector 52 by a distance 58 about equal to the depth 48 of the trench (about two inches in the illustrated embodiment). A center divider plow 64 is also positioned at a lateral position between the trench detector 56 and the surface detector 52 to help keep the cut or plowed material (lignite for the seam 20) from falling into the trench 40.

Figure 3:
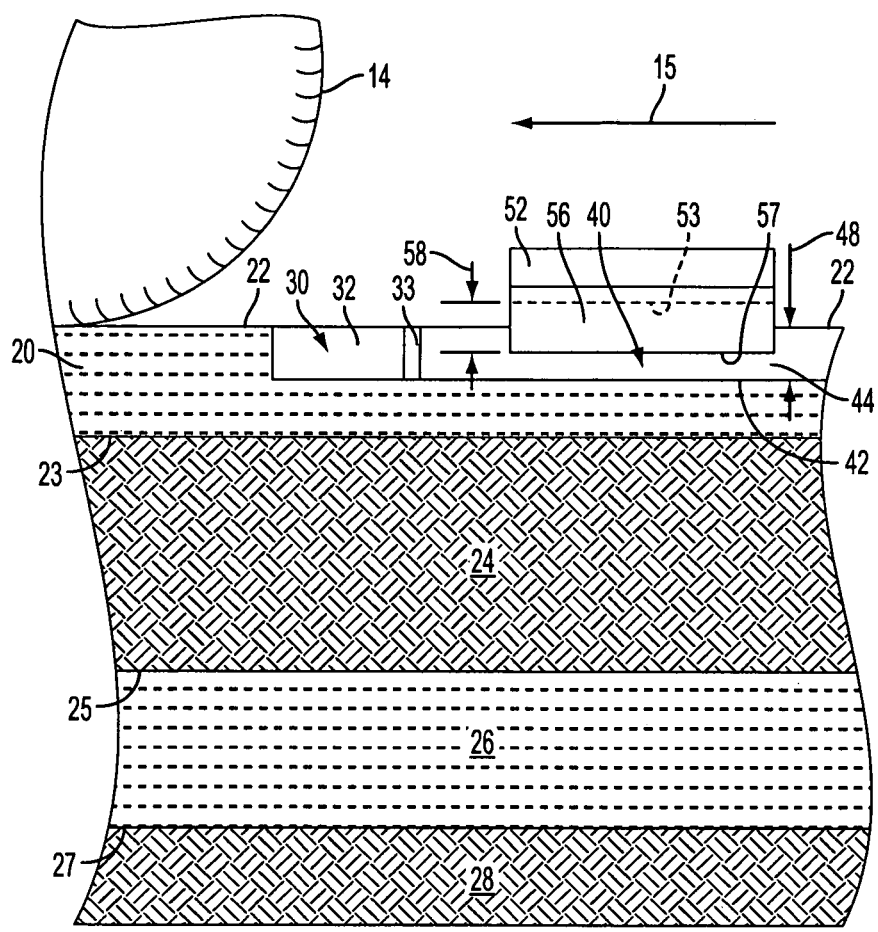
FIG. 3 is a schematic side view of the system of FIG. 1.
Figure 4:
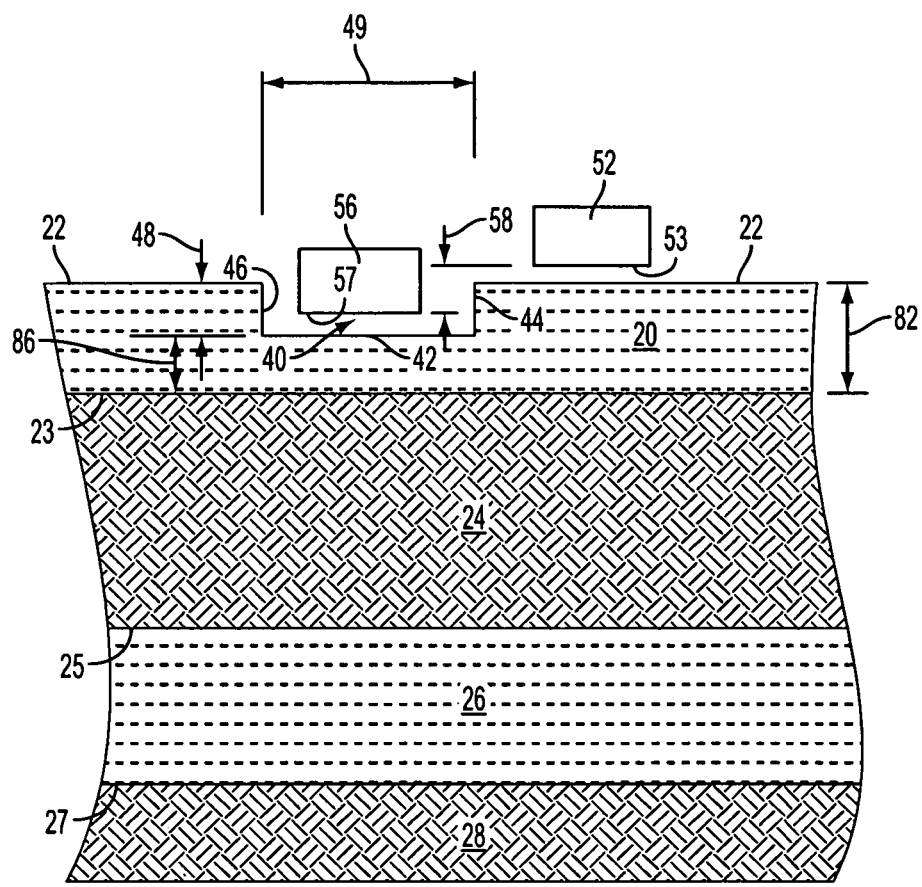
FIG. 4 is a schematic rear view of the system of FIG. 1, with the direction of travel into the page.

With reference to FIGS. 3 and 4, minerals such as lignite naturally occur as seams. Lignite may occur in multiple seams, with clay layers in between. The lignite seams may be about a foot thick to many feet thick. The detectors are primarily used when the final cut is being made at the interface. As illustrated, a seam 20 of lignite is shown being mined by cutter 14. Below the seam 20 is a layer 24 of non-desirable material. An interface 23 is defined between the adjoining seam 20 and layer 24. Below the clay layer 24 is another seam 26 of lignite, with an interface 25 between the layer 24 and seam 26. And, below the lignite seam 26 is another layer 28 of clay, with an interface 27 between the seam 26 and layer 28.

Surface miners can remove surface material to a depth of up to one to three feet or more, on a single pass. Ideally, the surface miner would remove substantially all of the desired material (the lignite in the illustrated embodiment) on a first pass, and then remove substantially all of the unwanted material (the clay in the illustrated embodiment) on a second pass. That way, the wanted material can be kept separate from the unwanted material with minimal required additional processing of the mined material. Note that before the second pass of the surface miner, for thick layers of unwanted material, road graders and bull dozers are commonly used to first remove most of the unwanted material.

Various materials naturally emit radiation with characteristics that may be correlated to the material. In the illustrated embodiment, lignite naturally emits a low level of gamma radiation, and clay naturally emits a much higher level of gamma radiation than lignite. Moreover, the lignite attenuates the gamma radiation emissions of the clay. So the presence of the lignite between the clay and the gamma detectors shields the gamma detectors from the gamma radiation emitted from the clay. The shielding effect varies with the thickness of the lignite present between the clay and the detector.

The radiation level in the lignite coal and the surrounding material is very low, therefore the detector should be very sensitive and extensive shielding should be used. The detector should have a large scintillation crystal, two by ten inches or larger. Regarding sensitivity, the detector should be efficient so that almost all of the gamma radiation entering the detector's scintillation crystal will be counted. And the field of view of the detector should be unobstructed without any shadows or blockage. Regarding shielding, the detector should be positioned as close as possible to the cut surface, and one to two inches or more of lead and one to two inches or more of steel should surround the detector scintillation crystal, except for the window defining the field of view. The required thickness for the shielding will depend on the radiation levels experienced in operation.

With reference to FIG. 4, by forming the trench 40 in the lignite seam 20, the thickness 86 of the seam 20 below the trench and below the trench detector 56 is smaller than the thickness 82 of the lignite seam 20 below the surface detector 52. The smaller thickness 86 will have a lesser shielding effect than the larger thickness 82, so the trench detector 56 will sense a higher gamma radiation level from emissions from the clay layer 24, than the surface detector 52 will sense. The seam detection system 10 uses this difference in sensed gamma radiation levels to immediately predict the distance between the cutter and the interface and to control, or prompt the operator to control, the miner 12 in real time to position the cutter 14 lower or higher to cut down to the interface 23.

Figure 5:
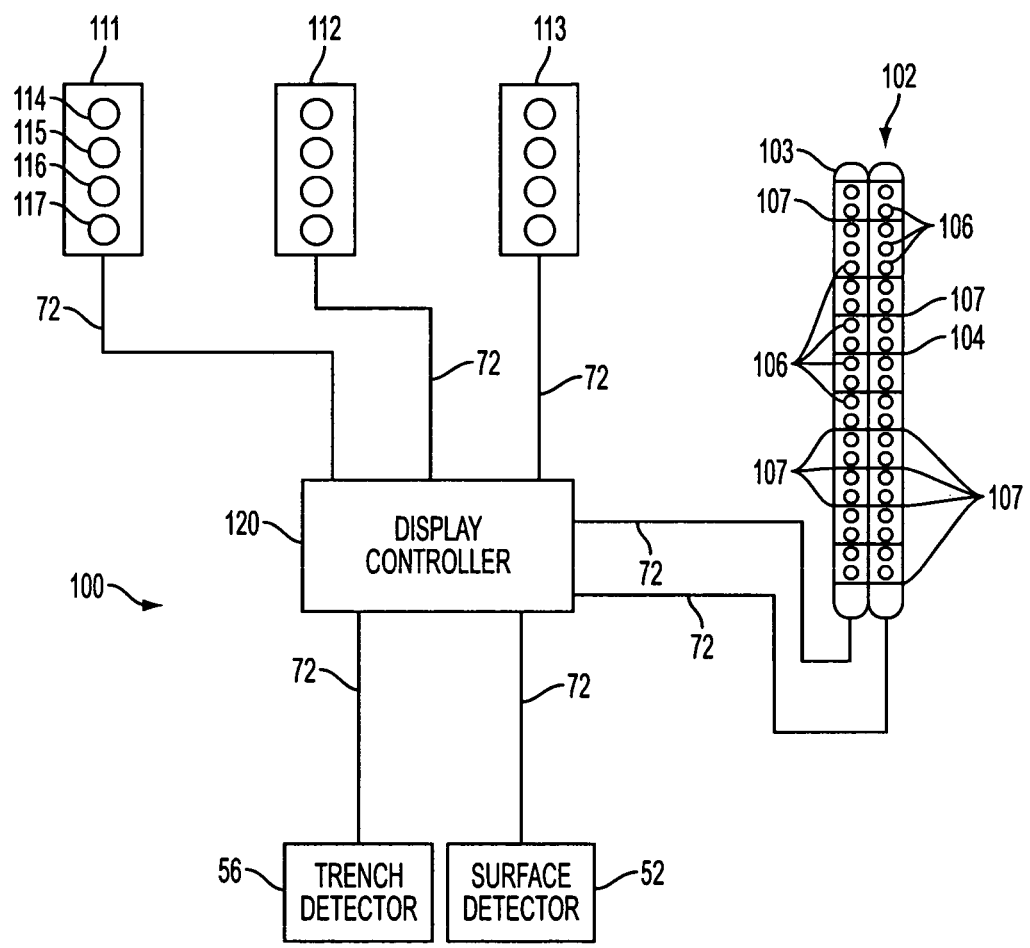
FIG. 5 is a schematic diagram of the display arrangement of the system of FIG. 1.

Refer now to FIG. 5, showing a display system 100 for prompting the operator to control the miner 12 using a plurality of displays. The signals generated by the trench detector 56 and the surface detector 52 are indicative of the frequency of gamma rays being counted by the detectors and are sent via the connections 72 directly (or indirectly through signal processing electronics/controllers) to a display controller 120. The controller 120 receives the signals and processes them to determine the display signals according to predetermined or programmed algorithms. A pair 102 of gamma count frequency displays 103, 104 are mounted side by side in the operator's view. The trench detector display 103 and the surface detector display 104 are constructed similarly. Each of the displays 103, 104 includes a vertical column of LED lights 106, and a plurality of spaced level markings 107 placed proximate the lights 106 over some or all of the height of the column of lights 106. The markings 107 may be labeled, such as between 0 (at the bottom) and 100 (at the top) to indicate percentages, for the operator's ease of reference. A suitable configuration may have 50 LEDs, adjusted so that the minimum radiation to be measured in a given mine is between the bottom 3-5 LEDs and the maximum radiation illuminating an LED that is less than the 45th LED, giving room for the maximum to occasionally reach, or nearly reach, the top LED when the radiation statistics produce such a maximum value. A suitable display may be an LED bar graph provided by Otek of Tucson, Ariz. The lights 106 may be all the same color or may be a different color for the display 103 as for the display 104 to help the operator distinguish between them. Moreover, the color of the lights may change from top to bottom gradually or by zone. The markings 107 and different colored lights are to help the operator read the displays to recognize levels quicker to speed up his reaction time.

The controller 120 sends signals based on the gamma count frequency to the displays 103, 104 via the connections 72. All of the LED lights 106 are simultaneously lit to form a column of lit lights from and between the bottom of a display 103 up to a level that corresponds to the gamma count frequency. The LED lights 106 above the level are not lit. So the operator sees a pair of columns of lights, one for each display 103, 104. A higher gamma count frequency corresponds to a higher level on the display. There are more lights 106 than markings 107, so that level may fall at or between markings 107. Alternatively, rather than a column of lights, only one LED may be lit at the level to be indicated. The lights 106 are LEDS, but may be other types of lights. The absolute and relative heights of the two columns of lit lights indicate to the operator what action is needed with respect to raising or lowering the cutter, as described in FIGS. 11 and 12. The amount of radiation emitted from the lignite and clay and other materials being removed by the miner is fairly consistent over a small area, such as a few acres or more, but can vary significantly over larger areas. As he is mining, the operator learns the changing significance of the levels of the lit columns of the displays 103, 104 and adapts his control of the cutter height accordingly.

Further, the system 100 may indicate on a display module 111, 112, 113 whether the cutting drum 14 needs to be positioned lower or higher. Each of the display modules 111, 112, 113 is constructed similarly and displays the same information simultaneously. However, three display modules are placed near the operator, so he will have one in his view in each direction he is likely to look. In the illustrated embodiment, the display module 111 may be placed near the operator cab left window, the display module 113 near the operator cab right window, and the display module 112 near the floor window. Fewer or more numbers of displays could be used depending on the circumstances and the desired ease of viewing for the operator. Each of the display modules has four LED lights 114, 115, 116, 117. The operation of the lights is described further in FIGS. 11 and 12. The controller 120 sends signals based on the gamma count frequency to the display modules 111, 112 and 113 via the connections 72. One of the lights 114, 115, 116, 117 is lit at a time. Light 114 is red; light 115 is yellow; light 116 is green; and light 117 is red. Other colors could be used. Which light is lit indicates to the operator what action is needed with respect to raising or lowering the cutter, If the red light 114 or the yellow light 115 is lit, the operator lowers the cutter. If the green light 116 is lit, the operator holds his position. If the red light 117 is lit, the operator raises the cutter.

Some clay layers may be many feet thick, up to fifty feet or more. The upper portion of the thick clay layer may be removed by many means, such as with drag lines, dozers or shovels. When the thick clay layer has been reduced to a thin layer, such as for example a few feet, the remaining clay may be removed in a manner more precise and accurate with the surface miner 12 as describer herein.

Also, naturally occurring seams of lignite and other minerals, or layers of clay or shale, may not be uniform in thickness, but rather may change in thickness and may end all together and may reappear. At least some known mining techniques currently used may not be able to mine some of such seams and would waste the mineral. The mineral seam detection system described herein may control the miner to more precisely cut and recover the mineral than those known techniques.

Figure 6:
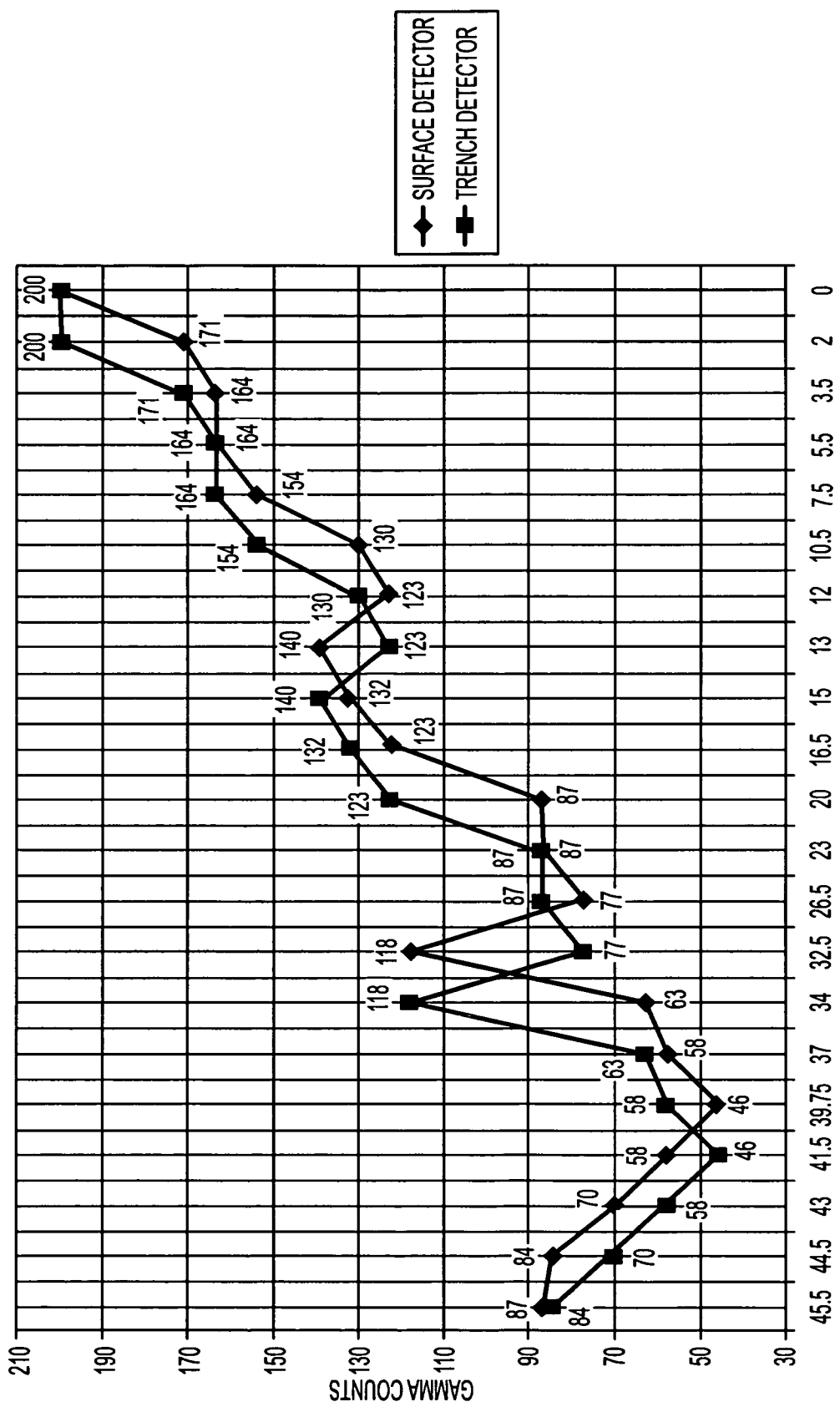
FIG. 6 is a graph of gamma counts detected by the detectors of the system of FIG. 1.

FIG. 6 shows a graph of gamma counts over a common period of time as a function of height above the coal/clay interface. The data was taken at two-inch intervals in a lignite coal field being mined. A single set of measurements was taken with a single detector. The same data is plotted on the graph twice, offset by two inches, to illustrate the differential counts that will be measured by the trench detector 56 and the surface detector 52. Line 132 represent the trench detector 56 and line 130 represents the surface detector 130. Although the gamma counts lower and raise as the detector passes through various layers of material, as it comes within a few inches of the coal/clay interface at 0 at the right of the graph, the number of counts increases sharply. When the surface detector 52 is reading 171 counts, the trench detector 56 is reading 200 counts. Both the difference in counts and the absolute value of counts indicate that the interface is being approached. The graph shows that other readings at greater distances from the interface may show large differential readings between the surface and trench detectors, but at lower absolute values. Then both detectors read the same, 200 counts, indicating that the interface has been reached.

If the trench detector 56 and the surface detector 52 are both reading a low level of radiation, with the detector 56 reading a little higher than the detector 52, then both detectors are in the coal seam 20 and the cutter 14 needs to cut deeper to get the surface 22 down to the interface 23. When the cutter 14 cuts deep enough so that the trench detector 56 reads high and the surface detector 52 reads substantially lower, the interface 23 has been approximately reached. If the cutter 14 cuts too deep, then both detectors will be in the clay 24 and read high levels of radiation.

After the lignite seam 20 is cut, the miner 12 will make another pass to cut the clay layer 24. If the trench detector 56 and the surface detector 52 are both reading a high level of radiation, then both detectors 56 and 52 are in the clay layer 24 and the cutter 14 needs to cut deeper to get the surface 22 down to the interface 25. When the cutter 14 cuts deep enough so that the trench detector 56 reads low and the surface detector 52 reads substantially higher, the interface 25 has been approximately reached. If the cutter 14 cuts too deep, then both detectors 52 and 56 will be in the lignite seam 26 and read low levels of radiation.

Preferably, the bottom of the detector assembly 16 on its high side, the side of surface detector 52, should be as near as possible to the same level as the bottom of the cutter 14 but not any lower than the cutter 14. Preferably, in the illustrated embodiment, the plow 30 for the trench should be about two inches below the surface 22. The detector assembly 16 is designed to have an about two-inch difference in elevation for the two detectors 52 and 56.

Figure 7:
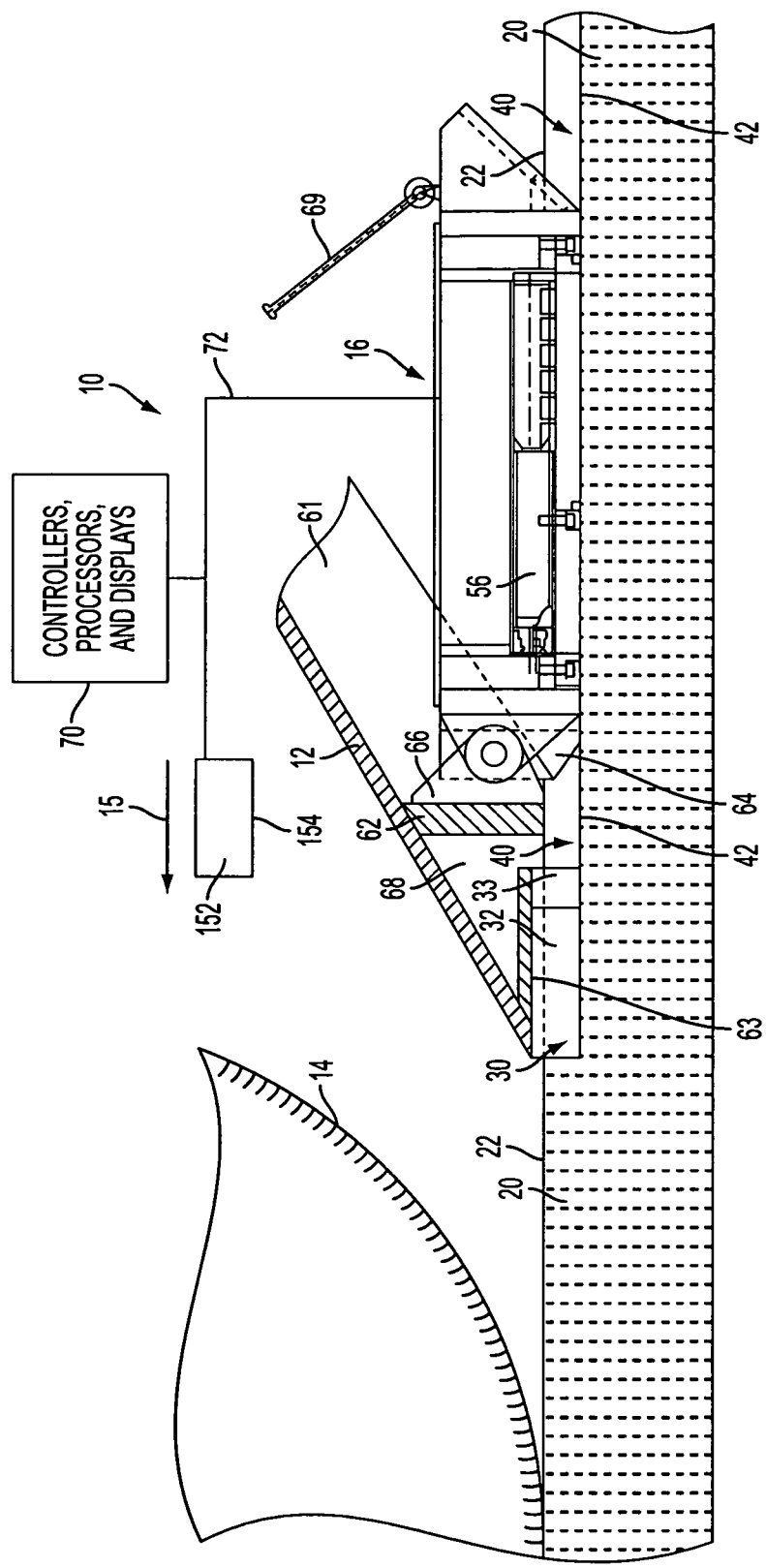
FIG. 7 is a view taken along line VII-VII of FIG. 8 of a mineral seam detector system mounted on a piece of equipment according to a second exemplary embodiment.
Figure 8:
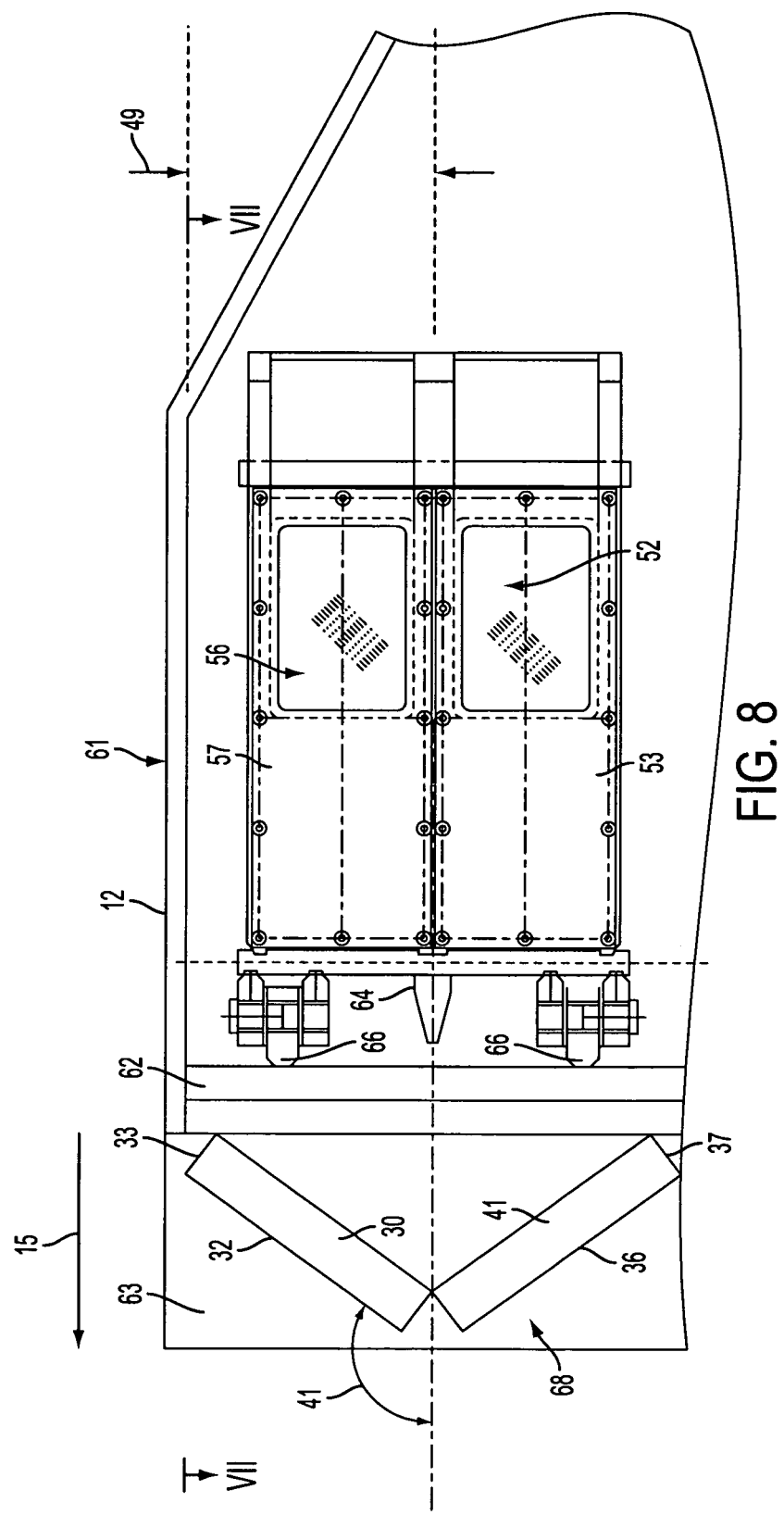
FIG. 8 is a bottom view of the system of FIG. 7.

With reference to FIGS. 7 and 8, for a mining machine where the mold board 68 is riding above the freshly-cut surface 22, rather than at the level of the surface 22, a surface plow 41, with leading side 36 and trailing end 37, may be added forward of the surface detector 52. The surface plow 41 removes the loose material, preferably down to or below the surface 22, so that both detectors 52 and 56 will be riding on or above uncut (solid) material.

The two plows, 30 and 41 should have a difference in elevation about equal to the difference in elevation between the two detectors 52 and 56, namely about two inches in the illustrated embodiment. For example, if the surface plow 41, which is removing loose material, is about one inch below the mold board 68 then the plow 30 making the trench would be three inches below the mold board 68.

The surface plow 41 may help to eliminate errant radiation level readings from surface detector 52. For example, if the surface 22 was at the interface 23 with the clay layer 24 and loose lignite was lying on top of surface 22, the surface detector 52 would read a lower level of radiation than it should with the miner 12 at the interface 23. This could result in the cutter 14 being adjusted lower and cutting unnecessarily into the clay layer 24. By providing the surface plow 41, loose lignite or clay is be removed between the surface 22 and the surface detector 52 thereby reducing the risk of errant radiation level readings.

With reference to FIG. 7, a mold board gamma detector 152 may also be used in the system 10. The mold board gamma detector 152 would be positioned above the mold board 68 with its gamma detector window 154 facing the mold board 68. In this position, the mold board detector 152 is used to obtain additional independent measurement of radiation from any clay material that may have been mined and thus is deposited or moving over the mold board 68. These independent measurements may help to determine whether the cutter 14 is cutting into clay and allow the system, or an operator, to make appropriate changes to the position of cutter 14.

Figure 9:
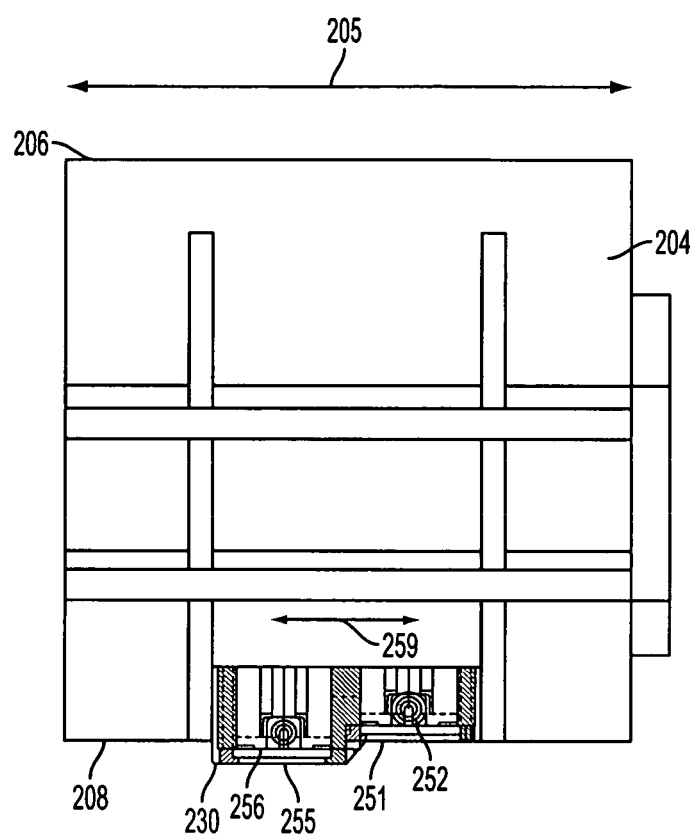
FIG. 9 is a mineral seam detector system mounted on a piece of equipment according to a third exemplary embodiment.
Figure 10:
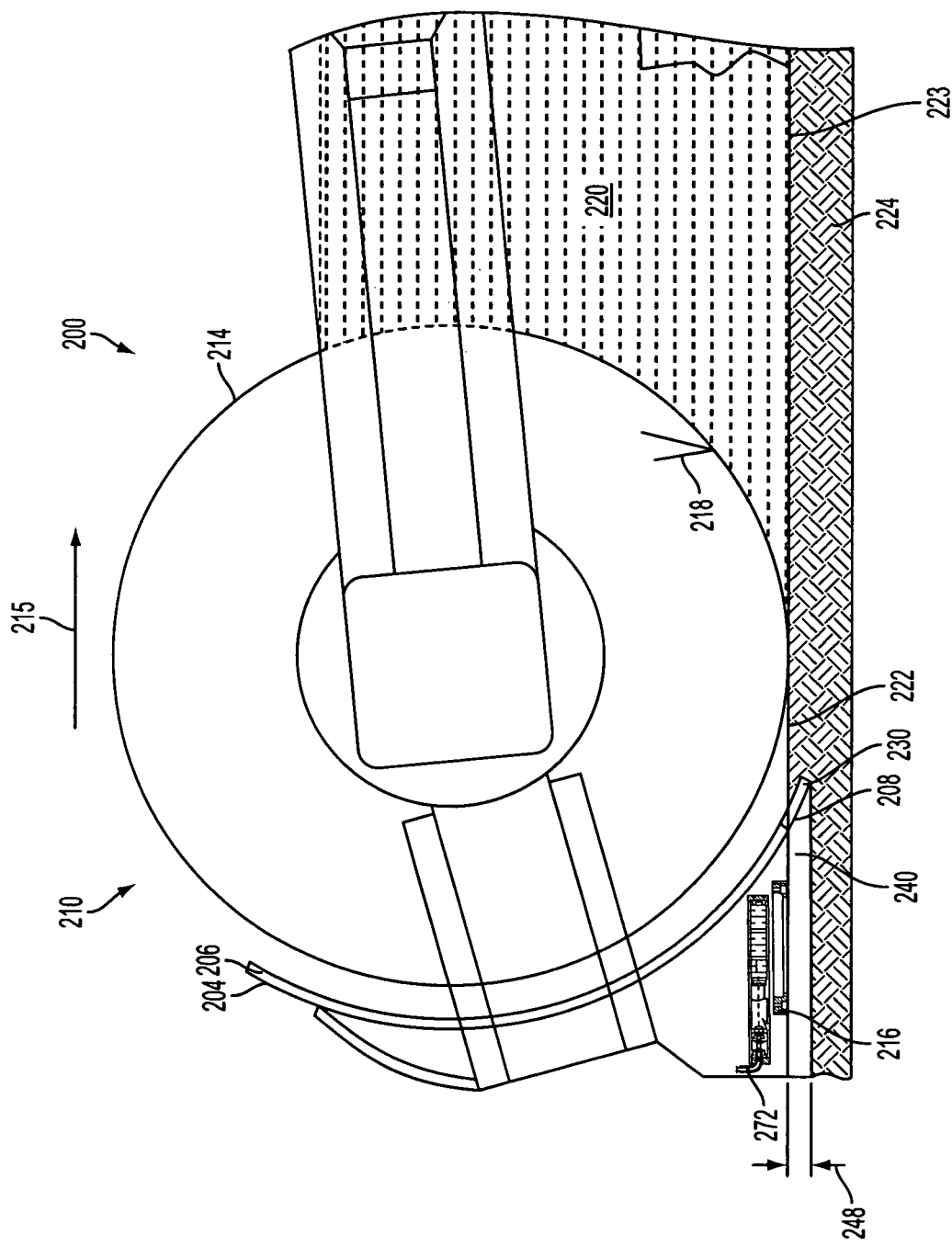
FIG. 10 is a side view of the system of FIG. 9.

Refer now to FIGS. 9 and 10, there being shown a mineral seam detector system 210 according to an exemplary embodiment. The system 210 includes a detector assembly 216, mounted to an underside of a cowl 204 of a trailing cutter drum 214 of a long wall miner 200.

The assembly 216 has two gamma detectors, a trench gamma detector 256 and a surface gamma detector 252, positioned side by side. The dual gamma detectors 252 and 256 are armored to protect them from the harsh environment. The detectors 256 and 252 are provided with windows 255 and 251, respectively, in the armor to allow gamma radiation to reach the detectors' gamma sensors. The centers of the windows 255 and 251 are positioned to have a distance 259 between them. In one embodiment, the distance 259 may be approximately 10.7 inches. The assembly 216 communicates by way of appropriate cabling or wireless connections or Bluetooth with controllers, computers, and displays.

The cowl 204 is an elongated metal plate that has a curvature similar to the curvature of the trailing cutter drum 214. The cowl 204 has a top end 206, a bottom end 208, and a width 205 and is attached to the cutter drum 214 with the bottom end 208 next to the cut surface 222. A portion of the bottom end 208 of the cowl 204 extends out to form a plow 230 positioned between the drum cutter 214 and the assembly 216.

In operation, as the long wall miner 200 travels forward in the direction 215, the trailing cutter drum 214 rotates to cut material from the surface of the earth with its cutter picks 218. In the illustrated embodiment, the cutter drum 214 is cutting a seam 220 of coal. In a typical long wall application, the desirable material 220 above the interface 223 would be bituminous or anthracite coal. The undesirable material 224 below the interface 223 would be fire clay. As the miner 200 moves forward, the cutter picks 218 of the drum 214 cuts down the seam 220 to form and leave behind a freshly-cut surface 222.

The plow 230 portion of the cowl 204 extends below the cut surface 222, so that the plow 230 forms a trench 240. The trench detector 256 is mounted so that its detector window 255 is positioned over the trench 240. The surface detector 252 is mounted so that its detector window 251 is not positioned over the trench 40. Further, the trench detector 256 is mounted lower than the surface detector 252 by a distance about equal to the depth 248 of the trench. The bottom 208 of the cowl 204 that does not form the plow 230 runs along the cut surface 222 removing lumps of coal 220 or undesithble material 224 so that the detectors 256 and 252 may receive accurate gamma readings from the material at the cutting surface 222 and in the trench 240.

The system 210 uses the detector assembly 216 as described above to determine if the drum 214 is cutting at the interface 223 between the coal 220 and the undesirable material 224. Based on the gamma readings collected by the detectors 256 and 252 of the assembly 216, the system 210, automatically or as controlled by an operator, adjusts the height of the trailing drum 214 to enable the long wall miner 200 to mine the majority of the coal 220 without mining the undesirable material 224.

Figure 13:
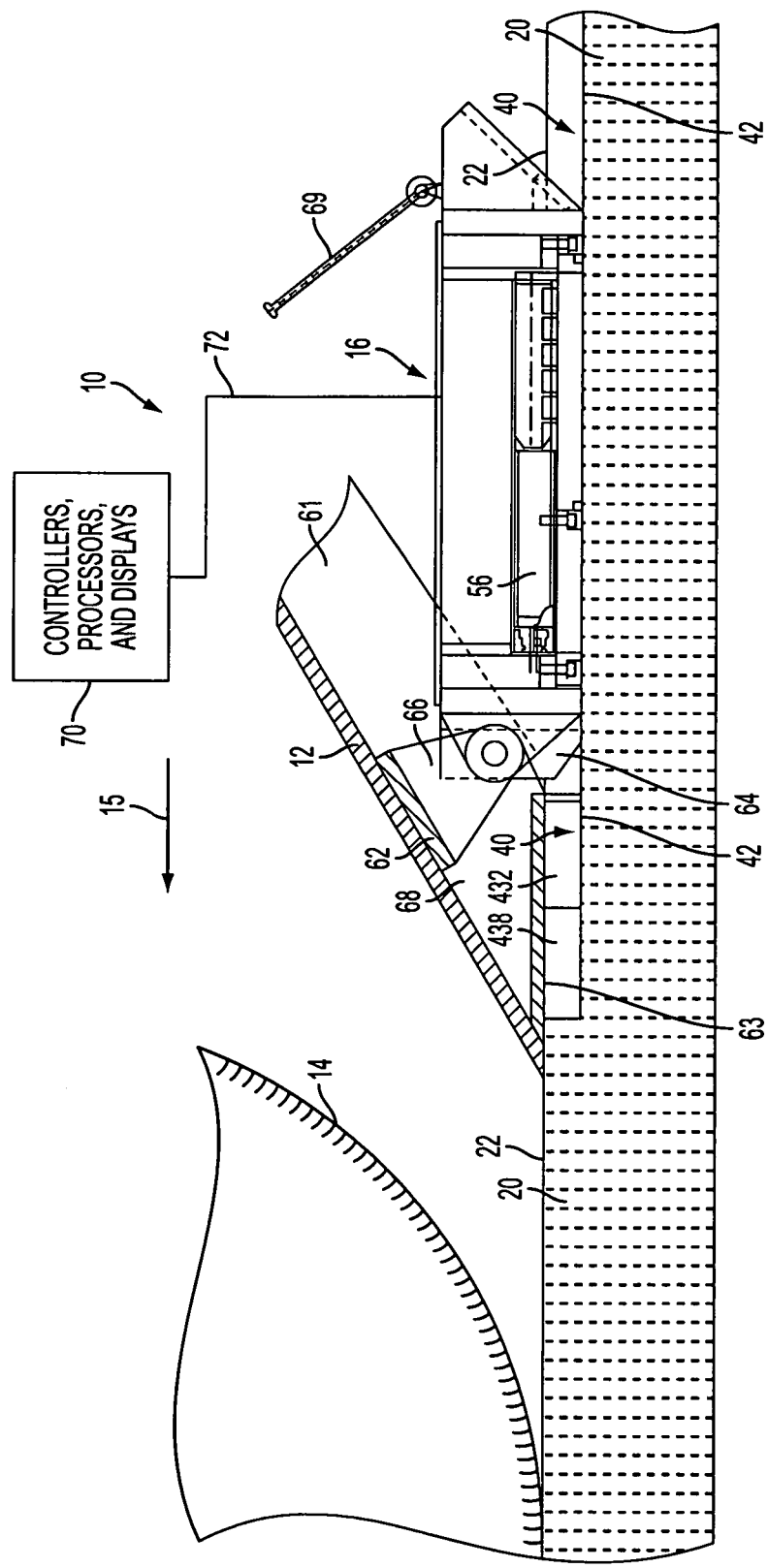
FIG. 13 is a view taken along line XIII-XIII of FIG. 14 of a mineral seam detector system mounted on a piece of equipment according to a fourth exemplary embodiment.
Figure 14:
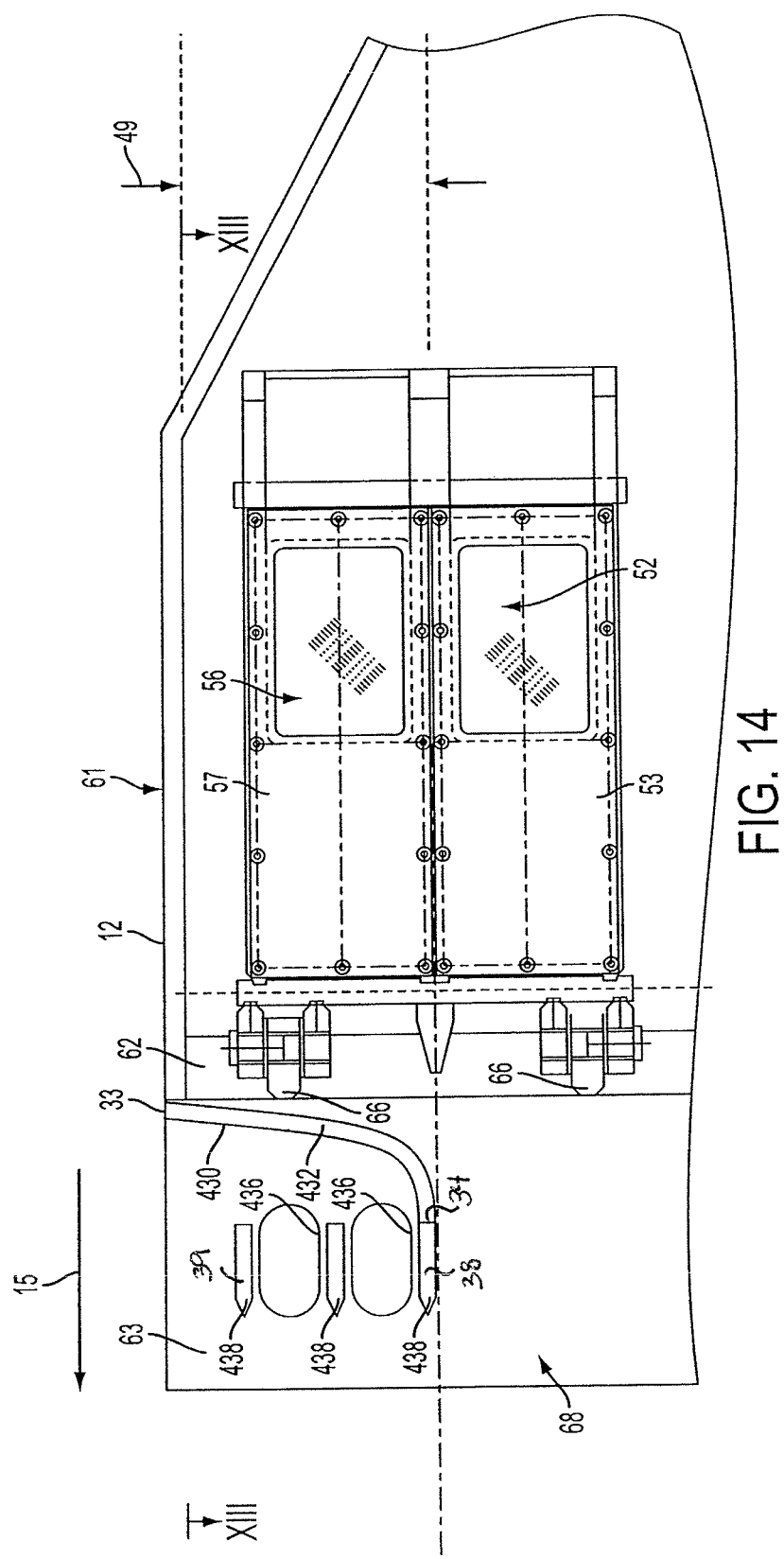
FIG. 14 is a bottom view of the system of FIG. 13.

With reference to FIGS. 13 and 14, rippers 438 are attached to the bottom surface of the mold board 68 bottom plate 63. A plow 430 has a cutting edge at the same level as the bottom of the rippers and a chute, and is positioned and attached behind the rippers 438. The first ripper 38 is attached to plow 430 towards its leading end 34, and the second ripper 39 is attached to the plow 430 toward its trailing end 33. The rippers 438 serve to break-up material ahead of the plow 430 to better enable the plow 430 to create the trench 40. The rippers 438 are elongated bars tapered to a cutting edge on their leading ends, with heights of about two inches, widths of about one half inch and lengths of about six inches. The rippers 438 and the cutting edges of the plow are made from very hard steel or partially to completely of tungsten. The chute of the plow can be made of carbon steel. A pair of slots or apertures 436, one positioned between each pair of neighboring rippers 438, in the mold board 68 provide a path through which excess cut material may move and escape, as the volume of the material increases significantly as it is broken up. The plow 430 is shaped with a chute leading side 432 having compound surfaces to lift the broken-up and cut material that has not escaped through the apertures 436 and move it to the side away from the trench 40. Based on the material in the layers being cut, the size of the plow 430, and other factors, more or less or rippers may be used.

Figure 15:
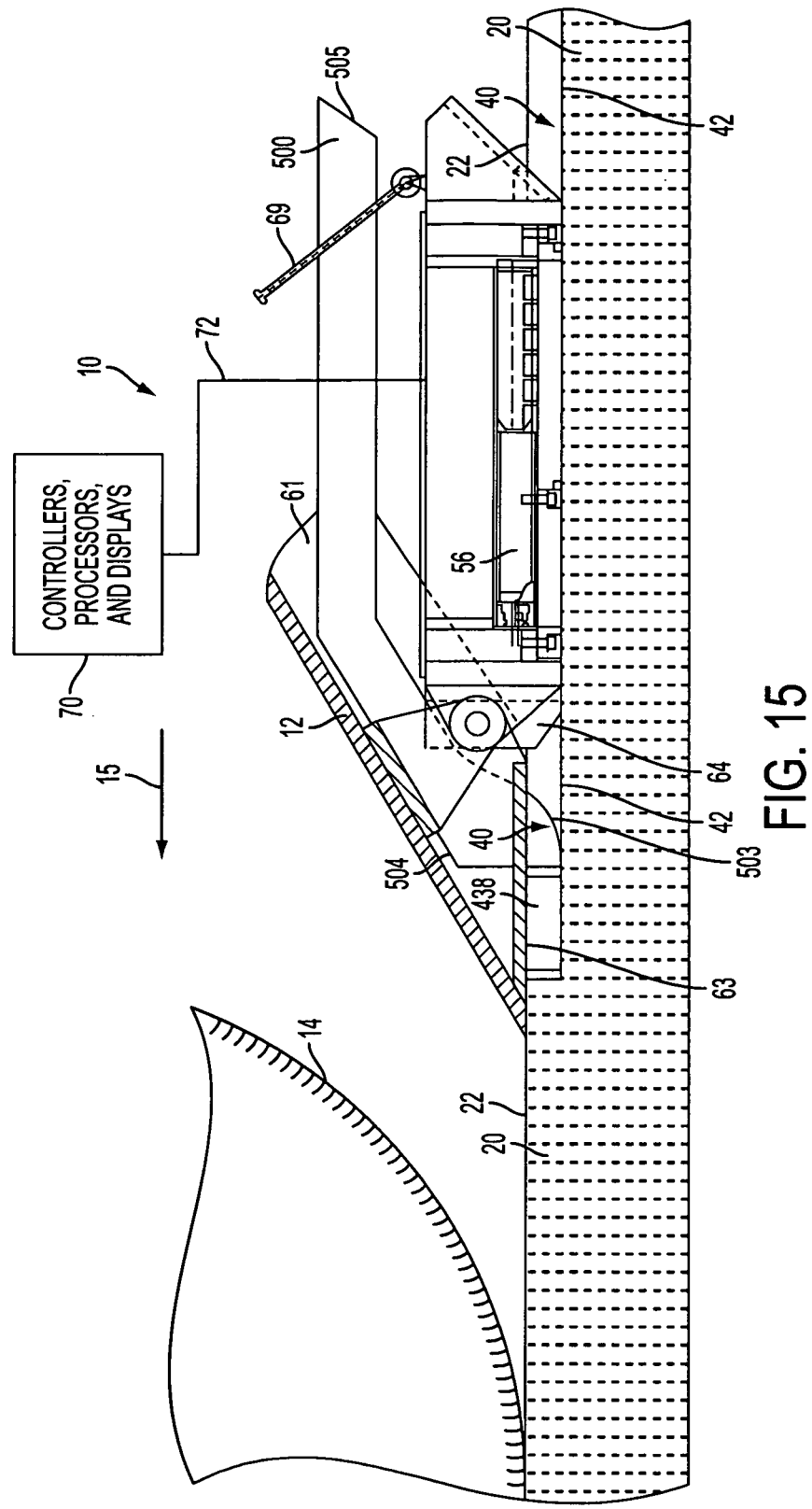
FIG. 15 is a view taken along line XV-XV of FIG. 16 of a mineral seam detector system mounted on a piece of equipment according to a fifth exemplary embodiment.
Figure 16:
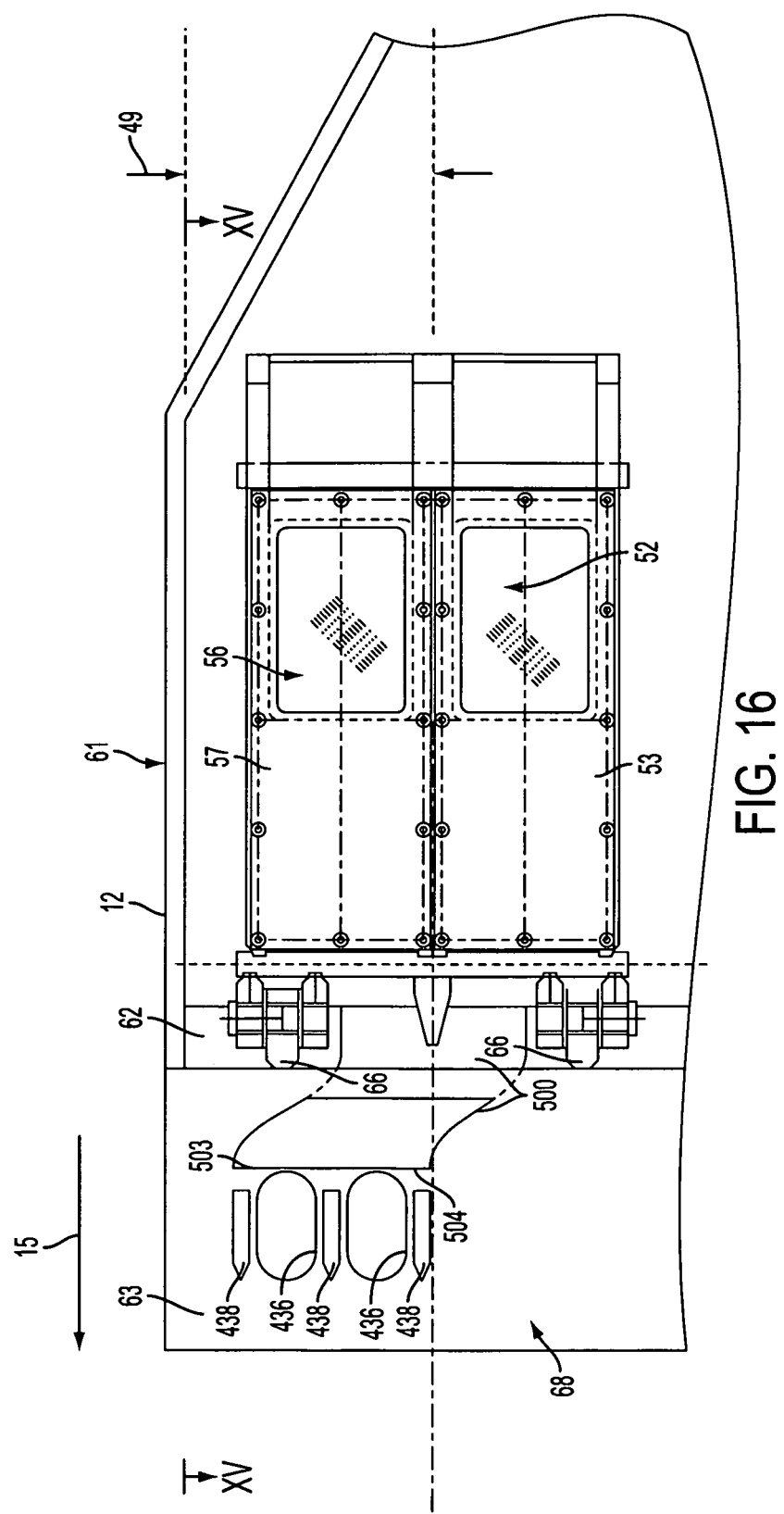
FIG. 16 is a bottom view of the system of FIG. 15.

Refer now to FIGS. 15 and 16, that illustrate another embodiment that is similar to the embodiment of FIGS. 13 and 14 but utilizes a chute 500 in place of the plow 430. The chute 500 is attached to the bottom surface of and extends through the mold board 68 bottom plate 63, and further extends under the mold board and over the detector assembly 61. The chute has an entrance opening 504 and an exit opening 505. The opening 504 is positioned and shaped to cut the trench 40. The chute 500 has a cutting edge 503 at the opening 504 at the same level as the bottom of the rippers, and is positioned and attached behind the rippers 438. As in the embodiment of FIG. 13, the rippers are particularly useful when the material to be cut is very hard and thus it is more difficult for the plow or chute to cut the trench without the material first being broken up. The chute 500 may be used without using the rippers. The cutting edges of the chute are made from very hard steel or partially to completely of tungsten. The chute can be made of carbon steel. The chute 500 is shaped with compound surfaces to lift the broken-up and cut material that has not escaped through the apertures 438 and that enters the opening 504 and move the material thorough the inside of the chute 500 over the detectors, to exit from the opening 505 behind the detectors. The clevis 66 may be repositioned to straighten of otherwise change the route of the chute 500.

Features may be added to allow even higher precision of control. For example, provisions can be made to allow a continuous averaging of the detector measurements during the many times when the miner must pause forward motion. Doing so allows the micro-computer to average the measurements over many seconds, or even minutes in some instances. This averaging essentially eliminates the effects of the statistical nature of the gamma radiations so that some very accurate measurements of specific locations of the formation can be made. Such information can be used to adjust the gain of the system to optimize to the formation in a particular mine or to different parts of a large mining complex where the radiation levels may vary somewhat.

A switch can be used by the operator to instruct the system to select algorithms that are optimized for either the mining mode or the cleaning mode.

A rotary switch may be provided to allow the operator to identify the seam that is being mined or cleaned so that the micro-controller can adjust parameters to optimize cutting given certain known characteristics of individual seams, such as the nominal radiation level and seam thickness.

A switch is provided to identify whether the current operation is mining or cleaning.

Memory modules can be incorporated that allow recording all gamma readings and all system decisions so that after use the data can be used to better optimize the algorithms The differential detector approach described herein can be applied to underground continuous miners by placing the dual detector and associated plow or scoop under the pan behind the cutter. The pan for underground continuous miners is similar to the moldboard for surface miners. The differential detector approach described herein can also be applied high wall mining.

The above description and drawings are only illustrative of preferred embodiments, and are not intended to be limiting. Any subject matter or modification thereof which comes within the spirit and scope of the following claims is to be considered part of the present inventions.

What is claimed as new and desired to be protected by Letters Patent of the United States is:

1. A mineral seam detector for use with a mining machine having a cutting drum, the detector comprising:
   a first gamma detector mounted to follow the cutting drum and positioned below a surface cut by the cutting drum; and
   a second gamma detector mounted to follow the cutting drum and positioned on or above the surface cut by the cutting drum,
   wherein the first and second gamma detectors are mounted such that each of the first and second gamma detectors detects gamma radiation coming from a direction of the surface cut by the cutting drum.

2. The detector of claim 1, further comprising a display indicating the level of gamma radiation for each of the detectors.

3. The detector of claim 2, wherein the display uses a plurality of lights to indicate the gamma level.

4. A mineral seam detector for use with a mining machine having a cutting drum, the detector comprising:
   a first gamma detector mounted to follow the cutting drum and positioned on or over a first surface that is below a surface cut by the cutting drum; and
   a second gamma detector mounted to follow the cutting drum and positioned on or over a second surface that is above the first surface,
   wherein the first and second gamma detectors are mounted such that each of the first and second gamma detectors detects gamma radiation coming from a direction of the surface cut by the cutting drum.

5. The detector of claim 4, further comprising a plow positioned between the cutting drum and the first gamma detector, the plow sized and shaped to cut a trench, wherein the bottom of the trench is the first surface.

6. The detector of claim 5, further comprising a ripper attached to the bottom of a mold board ahead of the plow.

7. The detector of claim 4, wherein the second surface is in the same plane as the surface cut by the cutting drum.

8. The detector of claim 4, wherein the second surface is below the surface cut by the cutting drum.

9. The detector of claim 4, wherein the second detector is in contact with the surface cut by the cutting drum.

10. The detector of claim 9, further comprising a plow positioned between the second detector and the cutting drum to remove material from above the surface cut by the cutting drum.

11. The detector of claim 4, wherein the first and second detectors are mounted to the bottom of a mold board of the mining machine.

12. The detector of claim 11, further comprising a third detector mounted above the mold board.

13. The detector of claim 4, wherein the mining machine is a surface mining machine.

14. The detector of claim 13, wherein the first and second detectors are mounted to a mold board of the surface mining machine.

15. The detector of claim 4, wherein the mining machine is a long wall miner.

16. The detector of claim 15, wherein the first and second detectors are mounted to a cowl of the long wall miner.

17. A control system for use with a mining machine having a cutting drum, the system comprising:
   a plow sized, shaped and positioned to cut a trench following the drum in a direction of travel of the mining machine, the trench having a trench depth below a surface cut by the drum; and
   a detector assembly mounted to follow the cutting drum proximate the surface cut by the drum, the assembly including
   a surface gamma detector, and
   a trench gamma detector, the trench detector being mounted to be positioned in or over the trench, and the surface detector being mounted to be positioned over the cut surface and higher than the trench detector by a distance equal to the trench depth.

18. A method of controlling a mining machine having a cutting drum, the method comprising the steps of:
   providing a first gamma detector mounted to follow the cutting drum and positioned over a first surface that is below a surface cut by the cutting drum and a second gamma detector mounted to follow the cutting drum and positioned over a second surface that is above the first surface, wherein the first and second gamma detectors are mounted such that each of the first and second gamma detectors detects gamma radiation coming from a direction of the surface cut by the cutting drum;
   detecting levels of radiation with the detectors; and
   controlling a cutting depth of the mining machine based on the detected radiation levels.

19. The method of claim 18, further comprising providing a plow positioned between the cutting drum and the first gamma detector, the plow sized and shaped to cut a trench, wherein the bottom of the trench is the first surface.

20. The method of claim 18, wherein the second surface is in the same plane as the surface cut by the cutting drum.

21. The method of claim 18, wherein the second surface is below the surface cut by the cutting drum.

22. The method of claim 18, wherein the second detector is in contact with the surface cut by the cutting drum.

23. The method of claim 22, further comprising the step of providing a plow positioned between the second detector and the cutting drum to remove material from above the surface cut by the cutting drum.

24. The method of claim 18, wherein the first and second detectors are mounted to the bottom of a mold board of the mining machine.

25. The method of claim 24, further comprising mounting a third detector above the mold board.

26. The method of claim 19, further comprising attaching a ripper to the bottom of a mold board ahead of the plow.

27. The method of claim 18, wherein the mining machine is a surface mining machine.

28. The method of claim 27, wherein the first and second detectors are mounted to a mold board of the surface mining machine.

29. The method of claim 18, wherein the mining machine is a long wall miner.

30. The method of claim 29, wherein the first and second detectors are mounted to a cowl of the long wall miner.

31. The method of claim 18, further comprising indicating the level of gamma radiation for each of the detectors.

32. The method of claim 31, wherein a plurality of lights is used to indicate the gamma level.

33. A method of controlling a mining machine having a cutting drum, the method comprising the steps of:

providing a plow sized, shaped and positioned to cut a trench following the drum in a direction of travel of the mining machine, the trench having a trench depth below a surface cut by the drum;

providing a detector assembly mounted to follow the cutting drum proximate the surface cut by the drum, the assembly including a surface gamma detector and a trench gamma detector, the trench detector being mounted to be positioned in or over the trench, and the surface detector being mounted to be positioned over the cut surface and higher than the trench detector by a distance equal to the trench depth;

detecting levels of radiation with the detectors; and controlling a depth of cut of the mining machine based on the detected radiation levels.

* * * * *